July 12, 1955  H. P. PHILLIPS  2,712,971
PISTON RING ASSEMBLY AND ELEMENTS THEREOF
Filed May 17, 1952
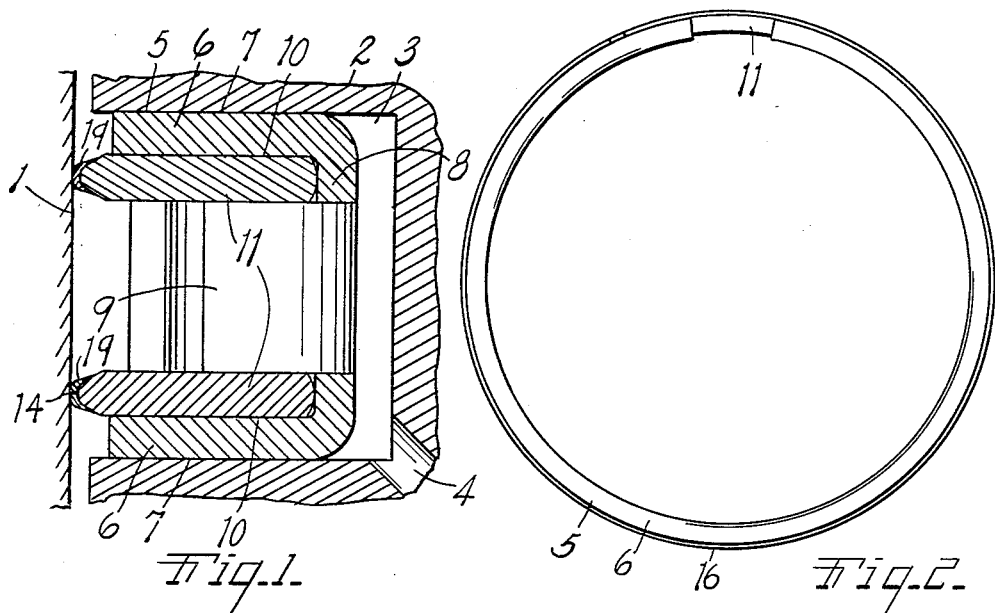
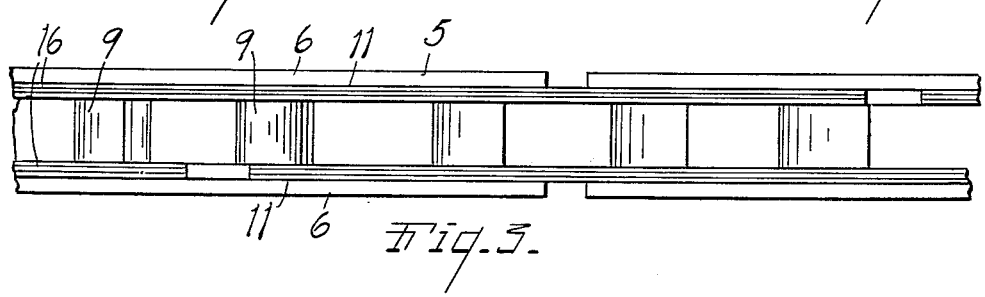
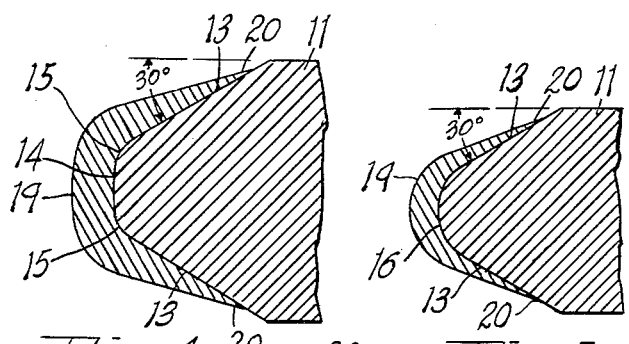
INVENTOR.
Harold P. Phillips
BY
ATTORNEY.

United States Patent Office 2,712,971
Patented July 12, 1955

2,712,971

PISTON RING ASSEMBLY AND ELEMENTS THEREOF

Harold P. Phillips, Hastings, Mich., assignor to Hastings Manufacturing Company, Hastings, Mich., a corporation of Michigan Application May 17, 1952, Serial No. 288,369

3 Claims. (Cl. 309—45)

This invention relates to improvements in piston ring assembly and elements thereof.

The main objects of this invention are:

First, to provide a piston ring assembly which may be completely assembled as a unit for merchandising and installation, and one which is highly efficient and durable in use.

Second, to provide a piston ring assembly which may be formed entirely of thin ribbon steel stock including the cylinder wall engaging elements, and at the same time one in which the cylinder wall engaging elements are effectively supported against dishing and distortion in use.

Third, to provide a split expansible piston ring assembly having these advantages and one which has a relatively high cylinder wall unit pressure in which the cylinder wall engaging elements are chrome plated and have substantially line contact engagement with the cylinder wall.

Objects relating to details and economies of the invention will appear from the description to follow. The invention is defined in the claims.

A structure which embodies the features of the invention is clearly illustrated in the accompanying drawing, in which:

Fig. 1 is an enlarged fragmentary vertical section of a cylinder and piston with the ring assembly of my invention installed therein, no attempt being made to show the parts in their relative proportions or the clearances and tolerances between the parts, the drawings being illustrative.

Fig. 2 is a side elevation view of the piston ring assembly embodying my invention in expanded position.

Fig. 3 is an enlarged fragmentary edge view looking downwardly from the top of Fig. 2.

Fig. 4 is an enlarged fragmentary view of one of the cylinder wall engaging elements in radial section.

Fig. 5 is a view similar to Fig. 4 of another form or embodiment of the invention.

Fig. 6 is a view similar to Figs. 4 and 5 of another form or embodiment of my invention.

The present invention is an adaptation of and in some respects an improvement upon the invention of my Patent No. 2,594,987 issued April 29, 1952, and in certain respects an adaptation of an improvement upon the invention of my Patent No. 2,614,899 issued October 21, 1952.

In the accompanying drawing 1 represents a cylinder and 2 a piston having a piston ring groove 3 therein provided with a drain opening 4, the ring assemblies illustrated being oil rings. No attempt has been made to show these parts in their proper proportions or with proper clearances or tolerances, and, as a matter of fact, these are varied as may be desired.

The combined annular split expansible carrier element designated by the numeral 5 is desirably that of my said patent and is of outwardly facing channel section, and is formed of ribbon steel or strips of sheet steel stock. The flanges 6 constitute side members and coact with the side walls 7 of the piston ring groove in which the assembly is installed as shown in Fig. 1.

The web portion 8 of the member 5 has angularly spaced portions struck out therefrom providing spacer elements 9, the end edges of these spacer elements being spaced from the flanges 6 and coacting with the flanges 6 in providing outwardly facing grooves 10 for the cylinder wall engaging elements 11. The portions of the web between the ends of the spacer members 9 and the flanges constitute bottoms for the grooves, the cylinder wall engaging elements 11 seating on the bottoms of the grooves as shown in Fig. 1.

The cylinder wall engaging elements 11 are formed of thin ribbon steel coiled edgewise, in the preferred embodiment of the order of .013 to .016 of an inch in thickness. They are effectively supported against distortion and dishing by their substantially fitting engagement between the flanges 6 and the spacer elements 9.

The carrier element constitutes an expander and separate expander springs are not commonly required although they may be used if particular conditions indicate that that is desirable.

The cylinder wall engaging elements 11 have beveled outer edges 13 which define or provide relatively narrow cylinder wall engaging surfaces or faces 14. In Fig. 4 this surface is slightly curved and merges into the beveled surfaces with the curved shoulders 15. In Fig. 5 the peripheral surface 16 is substantially curved, the curvature merging into the bevels 13. In Fig. 6 the peripheral surface 17 is flat but merges into the bevel surfaces 13 with the curved corner or shoulder portions 18.

In the embodiments illustrated the angle of the beveled surfaces 13 is approximately 30° relative to the corresponding sides of the ring elements 11. The peripheral wall engaging surfaces 14, 16 and 17 are provided with chrome plating 19 which extends or laps upon the beveled surfaces 13 tapering inwardly to substantially feather edges 20. In the embodiments shown in Figs. 4 and 5 the cylinder wall engaging elements have substantially line contact with the cylinder. This line contact surface widens somewhat with wear but it is relatively narrow substantially throughout the life of the assembly.

In the embodiment shown in Fig. 6 the contact is initially of some width but is much less than the thickness of the elements 11.

The peripheral surface or cylinder wall contacting or peripheral portions of the ring elements is approximately one-third the thickness of the ring elements. As stated, the ring elements are formed of ribbon steel desirably of the order of .013 to .016 and these very thin elements are effectively supported by the combined carrier and expander member against dishing and distortions in use.

While I illustrate the beveled surfaces as being at approximately a 30° angle relative to the sides of the ring elements, this angle may vary considerably. The angle might be viewed or considered relative to the cylinder wall contacting edge or periphery and considered from that angle it might satisfactorily be within the range or order of 60° to 80°. In all cases, the chrome plating should lap well upon the beveled or inwardly diverging surfaces of the ring elements and is desirably tapered inwardly in thickness on such surfaces as illustrated.

I have illustrated and described highly practical embodiments of my invention. I have not attempted to illustrate or describe other embodiments or adaptations as it is believed those skilled in the art will be able to adapt the invention as may be desired.

Having thus described by invention, what I claim as new and desire to secure by Letters Patent is:

1. A piston ring assembly comprising an annular split expansible carrier element of outwardly facing channel section formed of ribbon steel and having angularly spaced intermediate portions of the web thereof disposed outwardly between the flanges with their ends in spaced relation to the flanges and coacting therewith to provide axially spaced ring element receiving grooves, the portions of the web between the spacer element and the flanges constituting the bottoms of the grooves, split annular expansible cylinder wall engaging elements formed of ribbon steel of the order of .013 to .016 of an inch in thickness coiled radially edgewise and disposed edgewise in the grooves of the carrier element in axial thrust supported relation to the parts of the carrier element constituting the grooves, said cylinder wall engaging elements being beveled on both sides at their peripheral edges, the bevels defining relatively narrow cylinder wall engaging surfaces and chrome plating on the cylinder wall engaging surfaces of the ring elements extending onto the beveled surfaces thereof, the width of the peripheral cylinder wall engaging surfaces being approximately 1/3 the thickness of the ring elements.

2. A thin split cylinder wall engaging piston ring element formed of ribbon steel coiled edgewise and having flat parallel sides, an annular peripheral cylinder wall engaging face of a width approximately one-third the thickness of the element and substantially flat annular side surfaces disposed in inwardly diverging relation to each other of a width substantially exceeding the width of said peripheral face and merging into the same and into the flat sides, and chrome plating on the peripheral face of the ring extended upon the said annular surfaces and terminating in feather edges spaced inwardly from the planes of the sides.

3. A thin split cylinder wall engaging piston ring element formed of ribbon steel coiled edgewise and having substantially flat sides and an annular peripheral cylinder wall engaging face of a width approximately one-third the thickness of the element and annular side surfaces disposed in inwardly diverging relation to each other of a width exceeding the width of said peripheral face and merging into the same and into the flat sides, and chrome plating on the peripheral face of the ring and taperingly lapping the said annular surfaces and terminating in inwardly spaced relation to the flat sides of the ring.

References Cited in the file of this patent

UNITED STATES PATENTS

| 2,068,115 | Solenberger | Jan. 19, 1937 |
| 2,594,987 | Phillips | Apr. 29, 1952 |
| 2,596,286 | Phillips | May 13, 1952 |

FOREIGN PATENTS

| 821,748 | Germany | Nov. 19, 1951 |